(12) United States Patent
Kato

(10) Patent No.: US 6,685,411 B2
(45) Date of Patent: *Feb. 3, 2004

(54) BOLT

(75) Inventor: Takashi Kato, Nagoya (JP)

(73) Assignee: Meidoh Co., Ltd., Toyota (JP)

( * ) Notice: Subject to any disclaimer, the term of this patent is extended or adjusted under 35 U.S.C. 154(b) by 92 days.

This patent is subject to a terminal disclaimer.

(21) Appl. No.: 09/931,326

(22) Filed: Aug. 16, 2001

(65) Prior Publication Data

US 2002/0057954 A1 May 16, 2002

(30) Foreign Application Priority Data

Nov. 14, 2000 (JP) ........................................ 2000-346733
Apr. 27, 2001 (JP) ........................................ 2001-131499

(51) Int. Cl.⁷ .............................................. F16B 25/00
(52) U.S. Cl. ........................ 411/386; 411/411; 411/412; 411/423
(58) Field of Search .................. 411/386, 411, 411/412, 423

(56) References Cited

U.S. PATENT DOCUMENTS

| 447,775 | A | * | 3/1891 | Higbee | ........................ 411/436 |
|---|---|---|---|---|---|
| 2,021,704 | A | * | 11/1935 | Thatcher et al. | ............ 411/423 |
| 2,113,600 | A | * | 4/1938 | Olson | .......................... 411/386 |
| 3,878,759 | A | * | 4/1975 | Carlson | ....................... 411/416 |
| 4,915,560 | A | | 4/1990 | Peterson et al. | |
| 5,320,467 | A | * | 6/1994 | Erbes | .......................... 411/386 |
| 5,997,231 | A | | 12/1999 | Goodwin et al. | |
| 6,062,786 | A | | 5/2000 | Garver et al. | |
| 6,077,013 | A | * | 6/2000 | Yamamoto et al. | ......... 411/386 |
| 6,086,303 | A | * | 7/2000 | Fluckiger | .................... 411/399 |
| 6,296,432 | B1 | * | 10/2001 | Kato | .......................... 411/386 |

FOREIGN PATENT DOCUMENTS

EP          0625644          11/1994

* cited by examiner

Primary Examiner—Flemming Saether
Assistant Examiner—Jori Schiffman
(74) Attorney, Agent, or Firm—Cooper & Dunham LLP; Donald S. Dowden

(57) ABSTRACT

The object of the present invention is to dissolve effectively the problems of the encroaching, the seizure, and the racing.

To attain said object, a bolt having a threaded shank portion wherein a notch slanting toward the end of said threaded shank portion at an angle in the range between 15° to 80° for the axis of said threaded shank portion is formed at the beginning of the complete thread part to expand the width of the entrance of the thread part of said thread shank portion is provided in the invention.

8 Claims, 3 Drawing Sheets

101: bolt    103: shank portion (threaded shank portion)
104: guide boss    103A: thread part    103C: root of the thread
103E: entrance    104A: spiral guide groove    P: pitch

BOLT

FIELD OF THE INVENTION

The present invention relates to a bolt wherein oblique screwing of said bolt into a nut is prevented. More particularly, the present invention relates to a bolt having a threaded shank portion wherein a notch slanting toward the end of said threaded shank portion at an angle in the range between 15° to 80° for the axis of said threaded shank portion is formed at the beginning of the complete thread part of said thread shank portion.

DESCRIPTION OF THE PRIOR ART

It has been known that the encroaching, the seizure, or the racing between the bolt and the nut is caused by the oblique screwing of a bolt into the nut. Hitherto a bolt having a guide boss (204) has been provided as shown in FIG. 5. Said bolt (201) consists of a head portion (202), a shank portion (203) on which a thread part (203A) is formed (a threaded shank portion) and a guide boss (204) extended from the end of said shank portion (203). And the outer diameter Db of said guide boss (204) is settled to be a little smaller than the inner diameter Dn of a nut (105) into which said bolt (201) is screwed.

By employing said bolt (201) having a guide boss (204), the oblique screwing of said bolt (201) of said nut (105) is passably prevented because when said bolt (201) is screwed into said nut (105), said guide boss (204) whose outer diameter Db is a little smaller than the inner diameter Dn of said nut (105) is first inserted into the threaded hole (105A) of said nut (105).

Nevertheless in said traditional bolt (201), a little play exists between said guide boss (204) of said bolt (201) and the inside (105C) of said nut (105) such that the oblique screwing can not be prevented completely. And the problems of the encroaching, the seizure, and the racing are still not dissolved.

SUMMARY OF THE INVENTION

Accordingly, an object of the present invention is to dissolve effectively the problems of the encroaching, the seizure, and the racing.

Said object can be attained by employing a bolt having a threaded shank portion wherein a notch slanting toward the end of said threaded shank portion at an angle in the range between 15° to 80° for the axis of said threaded shank portion is formed at the beginning of the complete thread part of said thread shank portion.

Preferably said thread rises from the beginning of the thread part attaining to the height of the complete thread within the range from the beginning of the thread part to a position revolving at 50° from the beginning of the thread part.

Further, preferably said expanded width of the entrance of the thread part is set to be larger than the pitch of thread part and smaller than 1.5 times of the pitch of the thread part.

Still further preferably a guide boss is extended from the end of said shank part.

Still further preferably a spiral guide is formed on said guide boss, said spiral guide groove continuing to the root of the thread part of said threaded shank portion and being deeper than the root of the thread part excepting the boss end parts of said spiral guide groove.

Since said notch (103B) slanting to the end of said threaded shank portion is formed at the beginning of the complete thread part of the thread part (103A) to expand the width W of the entrance (103E) of the thread part, the entrance (103E) of the thread having an expanded width W is smoothly guided by the thread (105B) of said nut (105), and the oblique screwing of said bolt (101) is corrected by said notch (103B) when said bolt (101) is obliquely screwed into the threaded hole (105A) of said nut (105). In a case where a guide boss (104) is extended from the end of said shank portion (103) of said bolt (101), when said bolt (101) is obliquely screwed into the threaded hole (105A) of said nut (105), said oblique screwing is previously corrected by said guide boss (104) such that the correction of said oblique screwing by said entrance having an expanded width W of the thread part (103A) of said bolt (101), and said notch (103B) is more smoothly performed. Further, in a case where a spiral guide groove (104A) is formed on said guide boss (104), said spiral guide groove (104A) is screwed into the thread (105B) of said nut (105) and guided such that the previous correction of oblique screwing of said bolt (101) is more smoothly performed.

Figure 1:
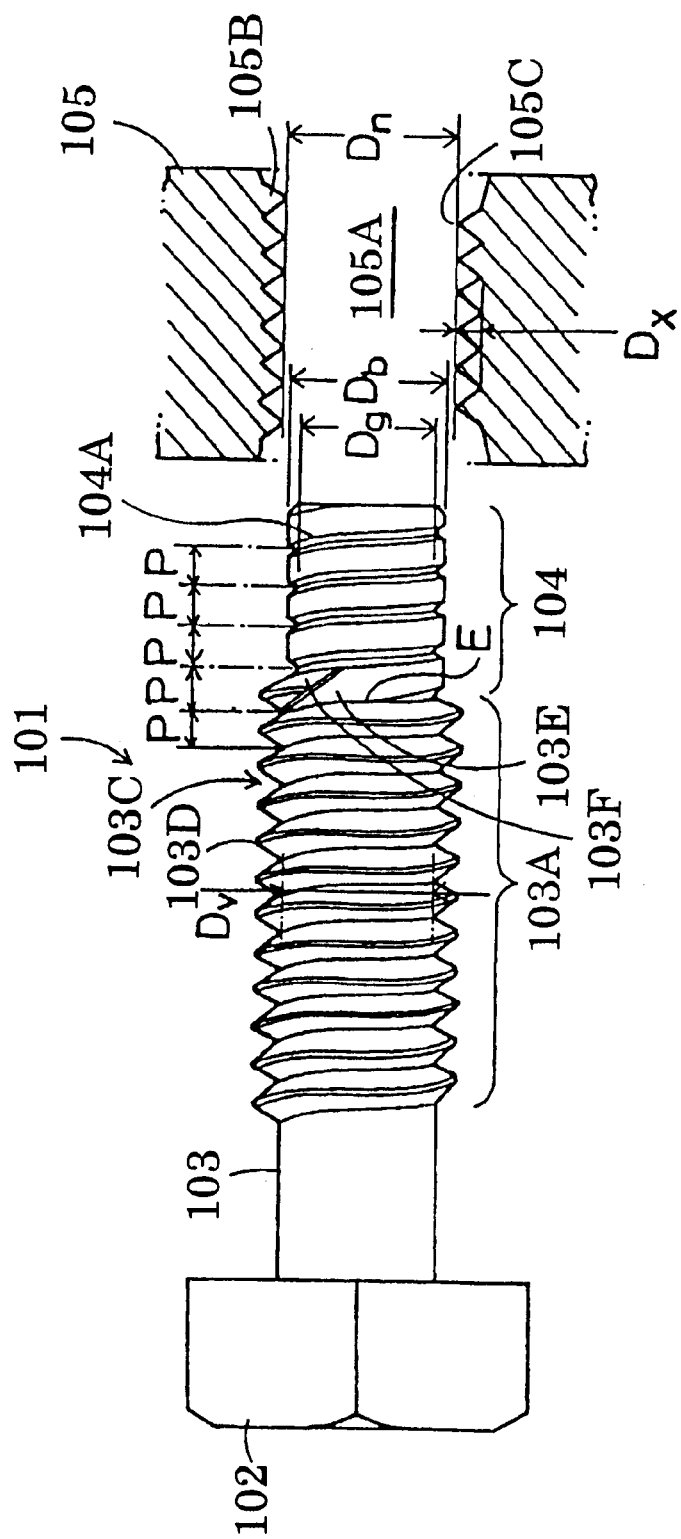
FIG. 1 is the side view of a bolt of the present invention.

In the drawings, (101) . . . bolt
(103) . . . shank portion (threaded shank portion)
(103A) . . . thread part
(103B) . . . notch
(103C) . . . root of the thread
(103E) . . . entrance
(104) . . . guide boss
(104A) . . . spiral guide groove
AX . . . axis
P . . . pitch
W . . . expanded width
θ . . . angle
α . . . range

DETAILED DESCRIPTION AND PREFERRED EMBODIMENTS

Figure 2:
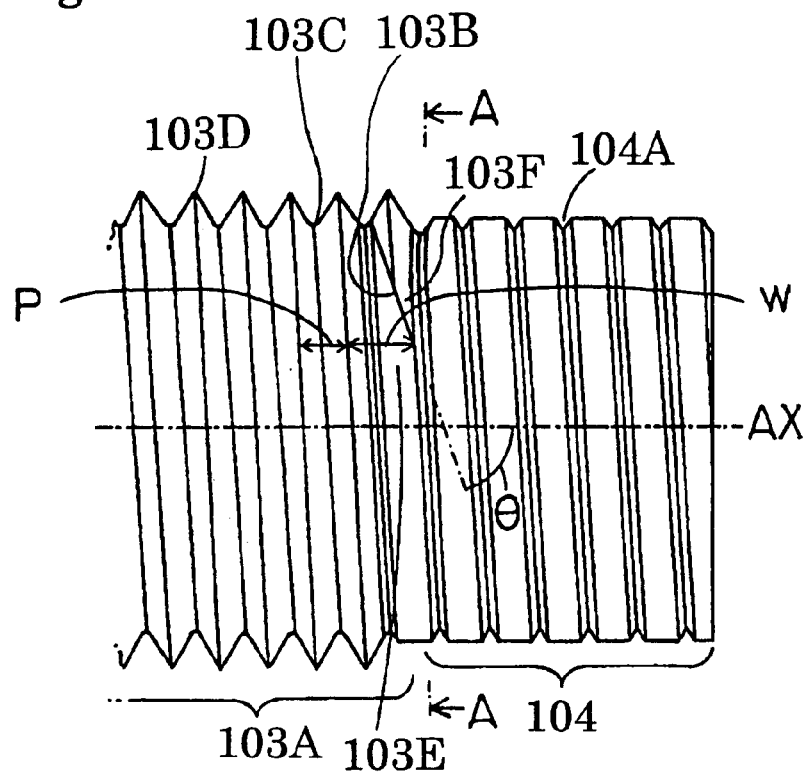
FIG. 2 is the enlarged side view of the end part of a bolt.

Referring now to FIG. 1, a bolt (101) consists of a head portion (102), a shank portion (103) on which a thread part (103A) is formed (a threaded shank portion), and a guide boss (104) extended from the end of said threaded shank portion (103). And the thread part (103A) consists of the thread (103D) and the root of the thread (103C). As shown in FIG. 2, a notch (103B) is formed at the beginning of the complete thread part of the thread part (103A) by the notching, the plastic working or the like. Said notch (103B) slants toward the end of said threaded shank portion (103) at an angle (θ) in the range between 15° to 80° (15°≦θ≦80°) for the axis AX of said threaded shank portion (103) to expand the width W of the entrance (103E) to 1.5 times of the pitch P of the thread part (103A) of said shank portion (103) (W=1.5 P). Said width W of the entrance (103E) may be settled to be larger than P or smaller than 1.5 P (P<W≦1.5 P).

Figure 3:
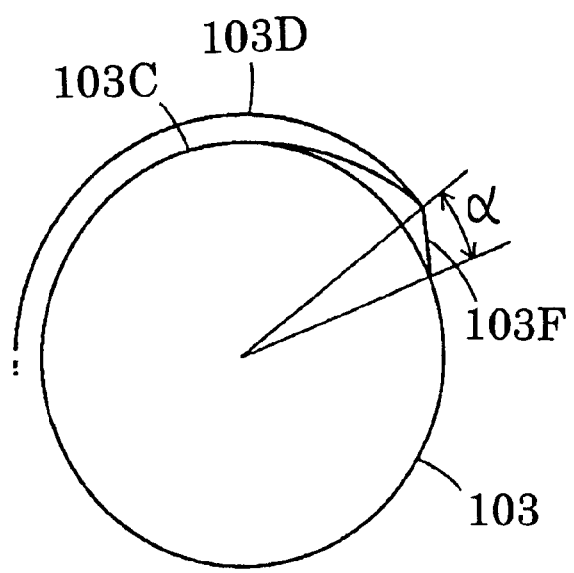
FIG. 3 is the sectional view taken along line A—A of FIG. 2.
Figure 4:
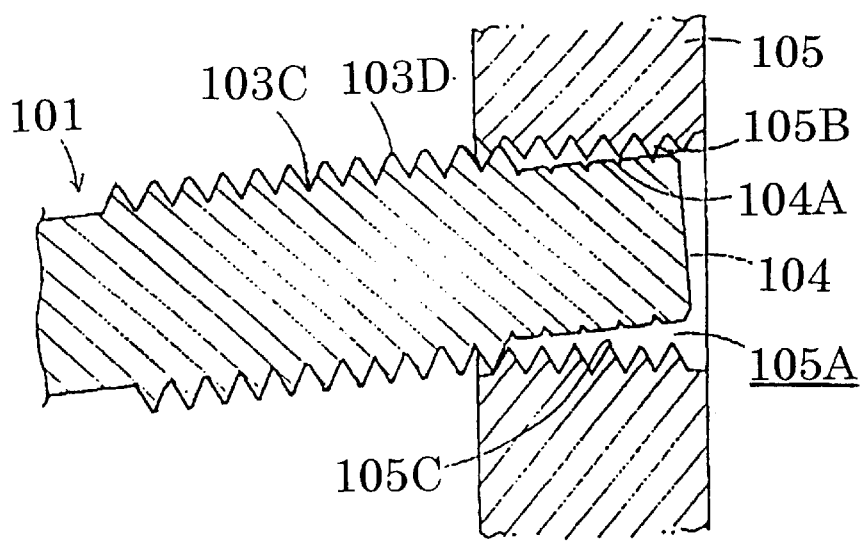
FIG. 4 is the end view when a bolt of the present invention is screwed into a nut.
Figure 5:
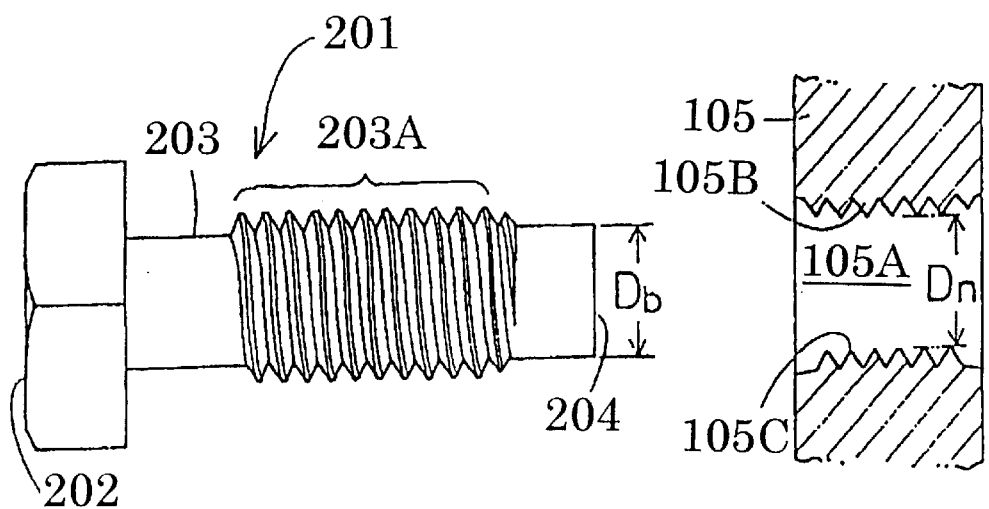
FIG. 5 is the side view of a traditional bolt having a guide boss.

As above described, an incomplete thread part (103F) the height of which gradually increases 0 to the height of the complete thread (103D) is formed at the beginning of the thread part (103A) by notching the beginning of the thread part (103A). As shown FIG. 3, said incomplete thread part (103F) rises from the beginning of the thread part (103A) to attain to the height of the complete thread (103D) within the range ($\alpha°$) from the beginning of the thread part (103A) to a position revolving at 50° from the beginning of the thread part (103A) ($\alpha° \leq 50°$), and $\alpha°$ may preferably be 15°. Further the external diameter Db of said guide boss (104) is settled to be a little smaller than the internal diameter Dn of a nut (105) into which said bolt (101) is screwed. Further the external diameter Db of said guide boss (104) is preferably settled to be a little larger than the root diameter Dv of said thread part (103A). In this embodiment, the circumstance edge at the end of said guide boss (104) is chamfered.

A spiral guide groove (104A) is formed on said guide boss (104) of said bolt (101). Said spiral guide groove (104A) continues to the root (103C) of the thread part (103A) and the pitch P of said spiral guide groove (104A) is settled to be equal to the pitch of the thread part (103A).

Further said guide groove (104A) is settled to be deeper than the root of the thread part (103A) excepting the boss end parts of said guide groove (104A), and the depth of said guide groove (104A) is preferably 10% to 70% of the height of the thread (105B) of said nut (105) into which said bolt (101) is screwed. Supposing that the root diameter of the thread part (103A) is Dv, the root diameter of said guide groove (104A) of said guide boss (104) is Dg, and the height of the thread (105B) of said nut (105) be Dx, $0.1\ Dx < (Dv - Dg)/2 < 0.7\ Dx$.

In a case where said bolt (101) is screwed into the threaded hole (105A) of said nut (105), first said guide boss (104) is inserted into the threaded hole (105A) of said nut (105). Since the external diameter Db of said guide boss (104) is settled to be a little smaller than the internal diameter Dn of said nut (105), a big slant of said bolt (101) for the threaded hole (105A) of said nut (105) is previously corrected by guiding said guide boss (104) into the threaded hole (105A) of said nut (105).

As the play exists between said guide boss (104) and the threaded hole (105A) of said nut (105), said bolt (101) is occasionally a little obliquely inserted into the threaded hole (105A) of said nut (105). Nevertheless since the guide groove (104A) is formed on said guide boss (104) of said bolt (101), the guide groove (104A) of said guide boss (104) is screwed into the thread (105B) of said nut (105) and said bolt (101) is propelled into the threaded hole (105A) of said nut (105) being guided by said screwing between the guide groove (104A) of said guide boss (104) of said bolt (101) and the thread (105B) of said nut (105) as a result said nut (105) removes toward the head position (102) of said bolt (101). When the end E of said guide groove (104A) of said guide boss (104) reaches the beginning of the thread (105B) of said nut (105), the thread part (103A) of said bolt (101) transfers to be screwed into the thread (105B) of said nut (105). In this case, the thread (105B) of said nut (105) is smoothly introduced into the root (103C) of the thread part (103A) and final correction of the slant of said bolt (101) is performed by said notch (103B) of said incomplete thread part (103F).

As above described, the slant of said bolt (101) is corrected and the thread (103D) of said bolt (101) and the thread (105B) of said nut (105) engages together normally to prevent the encroaching, the seizure, or the racing caused by the oblique screwing of said bolt. Further in a case where the range ($\alpha°$) of said incomplete thread part (103A), from the beginning of thread part (103A) to the position attaining the height of the complete thread (103D), is within 50° ($\alpha° \leq 50°$), preferably 15°, said correction of the slant of said bolt (101) is more smoothly performed and the encroaching caused by the oblique screwing of said bolt (101) is more effectively prevented. Further in a case where said notch (103B) slants toward the end of said shank portion preferably at 60° ($\theta = 60°$), the thread (105B) of said nut (105) is smoothly introduced into the thread (103C) of said bolt (101).

It is to be understood that the invention is not limited to the procedures and embodiments herein above specifically set form, but may be carried out in other ways without departure from its spirit. For instance, said guide boss (104) may not be necessary for the invention and the guide groove (104A) of said guide boss (104) may also not be necessary for the invention.

Further the chamfering of the circumstance edge at the end of said guide boss (104) may also not be necessary for the invention and the shape of the head portion (102) of said bolt (101) is not limited to be a hexagon. Further a head portion may have a flange and further said bolt may be a stud bolt.

In the present invention, the encroaching, the seizure, and the racing between the bolt and the nut are effectively prevented.

What is claimed is:

1. A bolt having a threaded shank portion wherein a notch slanting toward the end of said threaded shank portion at an angle in the range between 15° to 80° with respect to the axial direction of said threaded shank portion is formed at the beginning of the complete thread part of said threaded shank portion, wherein the beginning of the thread has a pitch between 1 and 1.5 times of the pitch of the complete thread part.

2. A bolt in accordance with claim 1, wherein said threaded shank portion comprises a thread that rises from the beginning of the threaded shank portion and attains to the height of the complete thread within the range from the beginning of the thread to a position angularly spaced by 50° from the beginning of the thread.

3. A bolt in accordance with claim 2 wherein a guide boss is extended from the end of said threaded shank portion.

4. A bolt in accordance with claim 3, wherein a spiral guide groove is formed on said guide boss, said spiral guide groove continuing to the root of the thread part of said threaded shank portion and being deeper than the root of the thread part excepting the boss end parts of said spiral guide groove.

5. A bolt in accordance with claim 1 wherein a guide boss is extended from the end of said threaded shank portion.

6. A bolt in accordance with claim 5, wherein a spiral guide groove is formed on said guide boss, said spiral groove continuing to the root of the thread part of said threaded shank portion and being deeper than the root of the thread part excepting the boss end parts of said spiral guide groove.

7. A bolt in accordance with claim 5, wherein a spiral guide groove is formed on said guide boss, said spiral guide groove continuing to the root of the thread part of said threaded shank portion and being deeper than the root of the thread part excepting the boss end parts of said spiral guide groove.

8. A bolt having a threaded shank portion wherein a notch slanting toward the end of said threaded shank portion at an angle in the range between 15° to 80° with respect to the axial direction of said threaded shank portion is formed at the beginning of the complete thread part of said threaded shank portion, wherein said threaded shank portion comprises a thread that rises from the beginning of the threaded shank portion and attains to the height of the complete thread within the range from the beginning of the thread to a position angularly spaced by 50° from the beginning of the thread, wherein the beginning of the thread has a pitch between 1 and 1.5 times of the pitch of the complete thread part.

* * * * *